United States Patent
Bates

[11] Patent Number: 5,868,500
[45] Date of Patent: Feb. 9, 1999

[54] SLIDE BEARING

[75] Inventor: James L. Bates, Wolverhampton, England

[73] Assignee: IMI Marston Limited, Wolverhampton, England

[21] Appl. No.: 492,410

[22] Filed: Jun. 19, 1995

Related U.S. Application Data

[63] Continuation-in-part of Ser. No. 145,520, Nov. 4, 1993, abandoned.

[30] Foreign Application Priority Data

Nov. 5, 1992 [GB] United Kingdom .................... 9223231

[51] Int. Cl.$^6$ ...................................................... F16C 29/02
[52] U.S. Cl. .................................. 384/37; 384/38; 384/42; 384/908
[58] Field of Search ................................. 384/37, 38, 42, 384/908, 300, 309, 117

[56] References Cited

U.S. PATENT DOCUMENTS 4,666,787  5/1987  Bickle et al. .

FOREIGN PATENT DOCUMENTS 1214032  11/1970  France .
616596  2/1949  United Kingdom .

OTHER PUBLICATIONS

"Vorrichtung . . . ", (1967).

Primary Examiner—Lenard A. Footland
Attorney, Agent, or Firm—Pillsbury Madison & Sutro LLP

[57] ABSTRACT

A slide bearing including an assembly of slide pads compressively mounted within a housing. The bearing allows a pipe to be held such that it may slide through the bearing whilst still accommodating lateral and pitch variations.

8 Claims, 1 Drawing Sheet

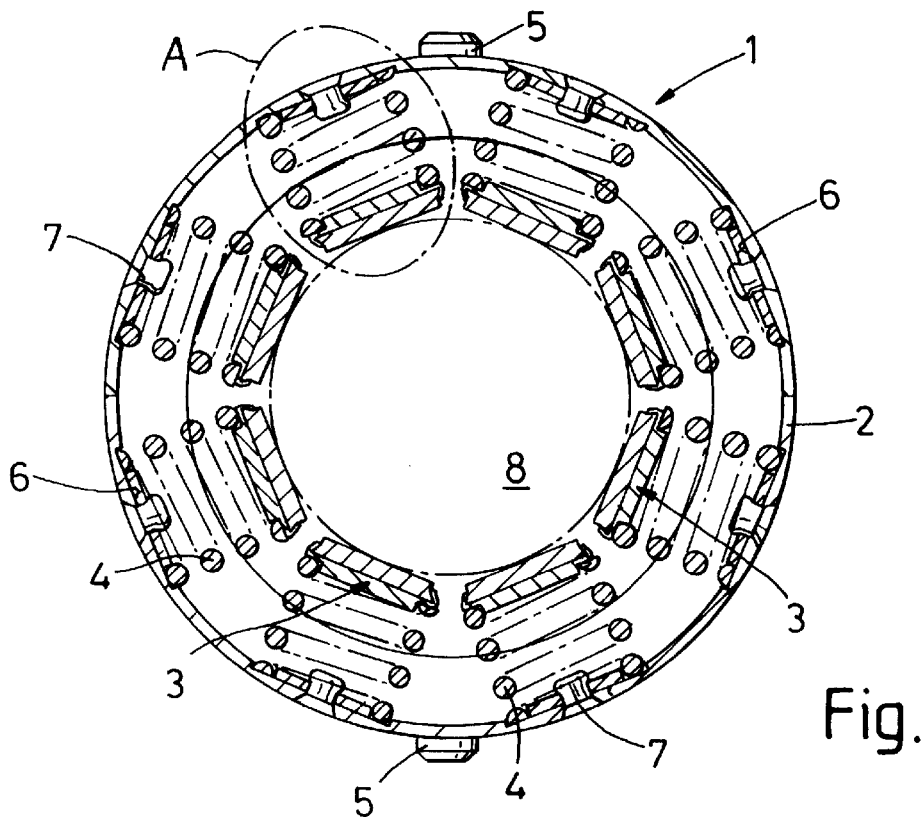
Fig. 1
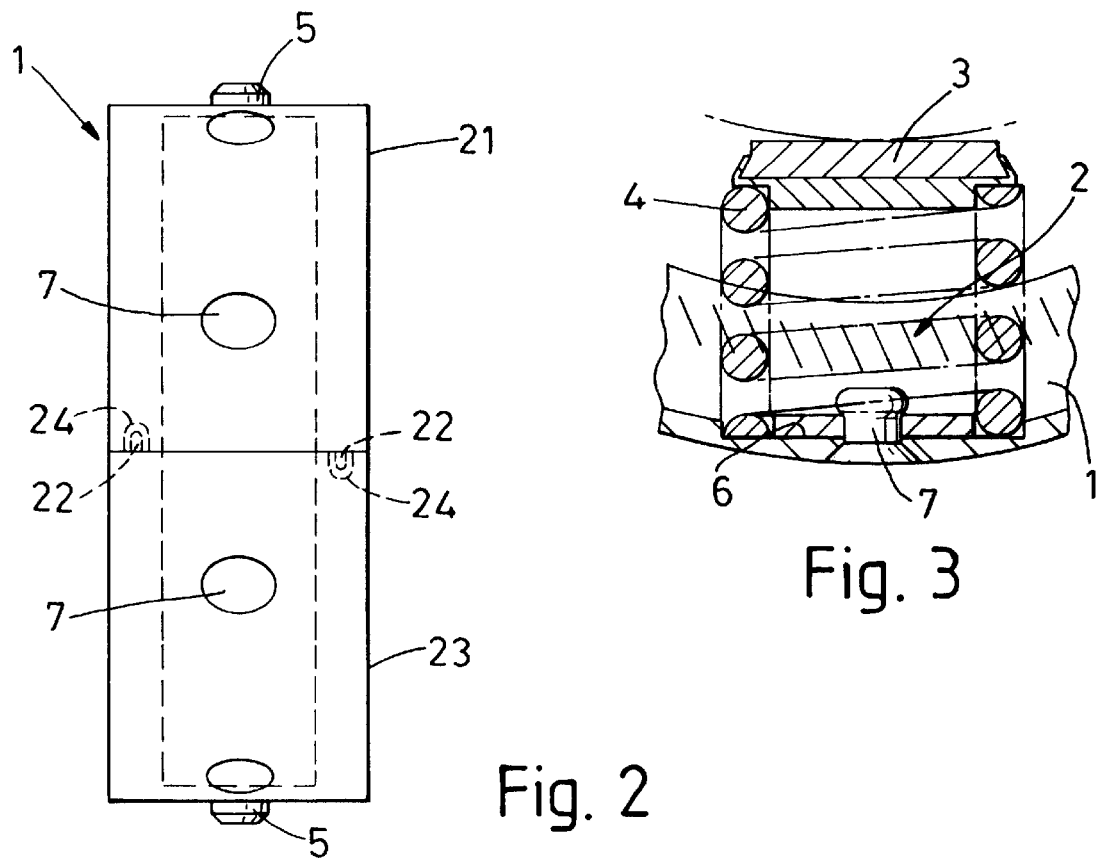
Fig. 2
Fig. 3

SLIDE BEARING

This application is a continuation in part of my application Ser. No. 08/145 2520 filed Nov. 4, 1993, and now abandoned.

This invention relates to a slide bearing and more particularly, but not exclusively, to a slide bearing for use within aircraft pipe structures.

BACKGROUND OF THE INVENTION

It is known that pipe structures expand and contract under pressure, temperature and load variations. Thus, within an aircraft it will be appreciated that pipe lengths may vary considerably during flight and as the environmental temperature changes. If nothing is done to compensate these pipe length variations, the pipes would bow and create reaction loads that may even rupture mountings and/or the aircraft skin.

Conventionally, these pipe expansion problems have been solved by incorporating kinks and bends in the pipe to compensate, for the expansion. However, in certain areas of an aircraft it is difficult to accommodate such kinks or bends due to space limitations. In these areas slide bearings are especially useful.

Typically a previous slide bearing has comprised an annular member through which the pipe passes with s packing material such as wire wool arranged to locate the pipe in the annular member. However, such assemblies are difficult to install and have a low reliability.

A slide bearing has also been proposed for a steam pipe in which the bearing comprises displaceable pad assemblies which define an accommodation for the pipe but bear on the pipe through point contacts only of spring-loaded balls.

It is an object of this invention to provide a slide bearing that substantially relives the above mentioned problems.

It is an object of this invention to provide a slide bearing for a pipe that can accommodate longitudinal expansion of the pipe together with radial and/or annular movement of the pipe.

SUMMARY OF THE INVENTION

In accordance with the present invention there is provided in one aspect a slide bearing for securing in a housing, said bearing leaving an annular member, said annular member including at least eight displaceable pad assemblies secured therein, said pad assemblies defining a slide envelope to grip a pipe, each said pad assembly including a slide pad secured upon a compression element such that the pad is substantially perpendicular to the compression element, each slide pad having a flat surface adjacent said slide envelope, whereby said slide pads of said pad assemblies within sad annular member define equal-spaced line contacts upon said slid envelope, said pads extending in the direction of the longitudinal axis of said slide envelope and said line contacts being substantially parallel to said longitudinal axis, said slide envelope being shaped to resiliently accommodate and secure a pipe through said line contacts in use even though the pipe may undergo axial and/or annular displacement.

In another aspect the invention provides an assembly comprising a length of pipe for transmitting a fluid, the pipe being secured at one of its ends to a source of the fluid, the pipe at at least one portion of its length being contained within a slide bearing, said bearing having an annular member, said annular member including at least eight displaceable pad assemblies secured therein, said pad assemblies defining a slide envelope to grip said pipe, each said pad assembly including a slide pad secured upon a compression element such that the pad is substantially perpendicular to the compression element, each slide pad having a flat surface adjacent said slide envelope, whereby said slide pads of said pad assemblies within said annular member define equal-spaced line contacts upon said slide envelope, said pads extending in the direction of the longitudinal axis of said slide envelope and said line contacts being substantially parallel to said longitudinal axis, said slide envelope being shaped to resiliently accommodate and secure said pipe through said line contacts in use even though the pipe may expand and contract and undergo axial and/or annular displacement.

Preferably, there are eight pad assemblies regularly spaced within the annular member but a greater number, e.g. twelve or sixteen, may be used, if desired, depending on the diameter of the pipe to be accommodated.

The slide pads may be fabricated from graphite, nylon, aluminium, bronze or Teflon.

The annular member may be fabricated from epoxy resin, aluminium or titanium.

The compression element may be a mechanical spring, a block of resilient plastics or rubber material or a hydraulic spring.

The annular member may be formed a seed of several segments to facilitate assembly and installation.

The pad assembly may be adjustable to enable the position of the slid pad in the bearing to be adjusted.

By virtue of the flat surface of the pads defining the slide envelope, a pipe accommodated within the side envelope will be in line contact with each pad, i.e. there will be a line of contact with each pad extending longitudinally parallel to tie longitudinal axis of the slide envelope and hence substantially parallel to the longitudinal axis of the pipe.

I have found that by having a minimum of eight flat pads and, therefore, a minimum of eight such line contacts, a pipe can be firmly accommodated while permitting longitudinal expansion and contraction of the pipe such as may occur when hot fluid, e.g. exhaust gas, passes through the pipe. Thus the slide bearings of my invention are particularly suited for use with a pipe which needs to be fixed to locations at or adjacent one or both of its ends and to have supports intermediate its ends and which will expand and contract in length during its use. Moreover, due to the flat nature of the pads) excessive frictional contact is avoided thereby providing the optimum balance between gripping and permitting sliding of the pipe without the excessive pressures that might be encountered if point contacts were used.

The number of pads to provide an adequate sliding bearing is dependent upon the envisaged maximum reaction load required for the pipe.

For example, to accommodate a pipe of outside diameter of from 1.0 to 6.0 inches, the surface of each of eight slide pads defining the slide envelope, may be rectangular and may be of, for example, from 1 to 3 inches in length and ½ to 1 inch in width, or be circular and of diameter from, for example, 1 to 3 inches. Thus in both these instances the pads have an elongation in the direction of the longitudinal axis of the slide envelope of 1.0 to 3.0 inches.

DESCRIPTION OF THE INVENTION

An embodiment of the present invention will now be described by way of example only with reference to the accompanying drawings in which:

FIG. 1 illustrates in schematic cross-section a slide bearing;

FIG. 2 illustrates a side view of the slide bearing; and

FIG. 3 illustrates in expanded view a portion A of the slide bearing.

Consider FIGS. 1 and 3, a slide bearing 1 principally comprises an annular member 2, slide pad 3 and compression elements 4. The annular member 2 has locating lugs 5 to enable the bearing 1 to be located and secured in a housing (not shown). However, it will be appreciated that the bearing 1 and a housing could be integral or permanently secured together.

The annular member 1 includes regularly about its periphery, recess areas 6 to locate and facilitate capture of the compression elements 4. Typically, the compression elements 4 are compression springs although it will be understood that solid or suitably formed compressible plastics or rubber material could be used. The elements 4 are usually secured by nipple elements 7 which include a shoulder portion to engage or secure the element 4 to the annular member 1. The pads 3 are located at the ends of the compression elements 4 and may be held by a pinch effect of the elements 4 on the pads 3 or through some other form of adhesion or mechanical means.

The pads 3 within the annular member 1 define a slide envelope 8 (shown in broken outline) to accommodate a pipe (not shown). The actual diameter of the envelope 8 is determined by the size of pipe it is envisaged it will accommodate. Furthermore, it will be appreciated that if the nipple element 7 extends to the pad 3 end is either screw or ratchet mounted it is possible to adjust the pad 3 position into the bearing 1 and so the range of compression. Ideally, each pad 3 and its compression element 4 should be under slight compression when a pipe is located in the bearing 1. With the compression elements 4 under slight compression the pipe will be more suitably held and located.

The pads 3 allow the pipe to slide under load and the compression elements 4 allow a degree of lateral movement. The material from which the pads 3 are fabricated depends upon the environment in which the bearing 1 must operate and upon the material of the pipe. Suitable materials include graphite, Teflon, ceramic materials, aluminium/bronze and nylon.

Eight pads 3 regularly spaced as illustrated in FIG. 1 is preferred.

The pads 3 extend in the direction of the longitudinal axis of a pipe to be held in the bearing 1 shown by the direction of arrow A–B in FIG. 2.

As indicated previously, a slide bearing of the present invention may be integral within a housing or may be a retro-fit component. It will be understood that a integral embodiment may have an integral annular member 1. However, such an integral construction of the annular member would be inconvenient for a retro-fit embodiment. Consequently, it is typical for the annular member 1 to be formed of several segments. These segments enable an in-site pipe to be surrounded by the bearing 1.

Referring to FIG. 2, the annular member 1 consists of two equal segments 21, 23 respectively located by protrusion 22 and recesses 24 in respective segments 21, 23, in order to secure the segments 21, 23 together straps may be placed around the annular segments 21, 23 together to form the annular member 1. As an alternative, the segments 21, 23 could be mounted in respective halves of a housing and the annular member 1 formed when the housing is constructed. The locating lugs 5 in the annular member 1 may be used as securing points in order to make the slide bearing 1 integral with the housing.

It will be appreciated that the annular member 1 constitutes a large proportion of the weight of the slide bearing 1. Thus, for aircraft applications its weight must be as low as possible so the annular member 1 may be made from thermo-setting epoxy resin, aluminium or titanium.

I claim:

1. A slide bearing for securing in a housing, said bearing having an annular member, said annular member including at least eight displaceable pad assemblies secured therein, said pad assemblies defining a slide envelope to grip a pipe, each said pad assembly including a slide pad secured upon a compression element such that the pad is substantially perpendicular to the compression element, each slide pad extending in the direction of the longitudinal axis of said slide envelope and having a flat surface adjacent said slide envelope, whereby said slide pads of said pad assemblies within said annular member define equal-spaced line contacts upon said slide envelope, said line contacts extending only in a direction substantially parallel to said longitudinal axis, said slide envelope being shaped to resiliently accommodate and secure a pipe through said line contacts in use even though the pipe may undergo axial and/or annular displacement.

2. A slide bearing according to claim 1, wherein there are eight pad assemblies spaced within the annular member.

3. A slide bearing according to claim 2, wherein the slide pads are fabricated from a material selected from the class consisting of graphite, nylon, aluminium, bronze and polytetrafluoroethylene teflon.

4. A slide bearing according to claim 1, wherein the slide pads are fabricated from a material selected from the class consisting of graphite, nylon, aluminum, bronze and polytetrafluoroethylene teflon.

5. A slide bearing according to claim 1, wherein the annular member is fabricated from a material selected from the class consisting of epoxy resin, aluminium and titanium.

6. A slide bearing according to claim 1, wherein the compression elements are selected from the group consisting of mechanical springs, blocks of resilient plastics material, blocks of resilient rubber material and hydraulic springs.

7. A slide bearing according to claim 1, wherein the annular member is formed of several segments to facilitate assembly and installation.

8. A slide bearing according to claim 1, wherein the pad assembly is adjustable to enable the position of the slide pad in the bearing to be adjusted.

* * * * *